United States Patent Office 3,165,913
Patented Jan. 19, 1965

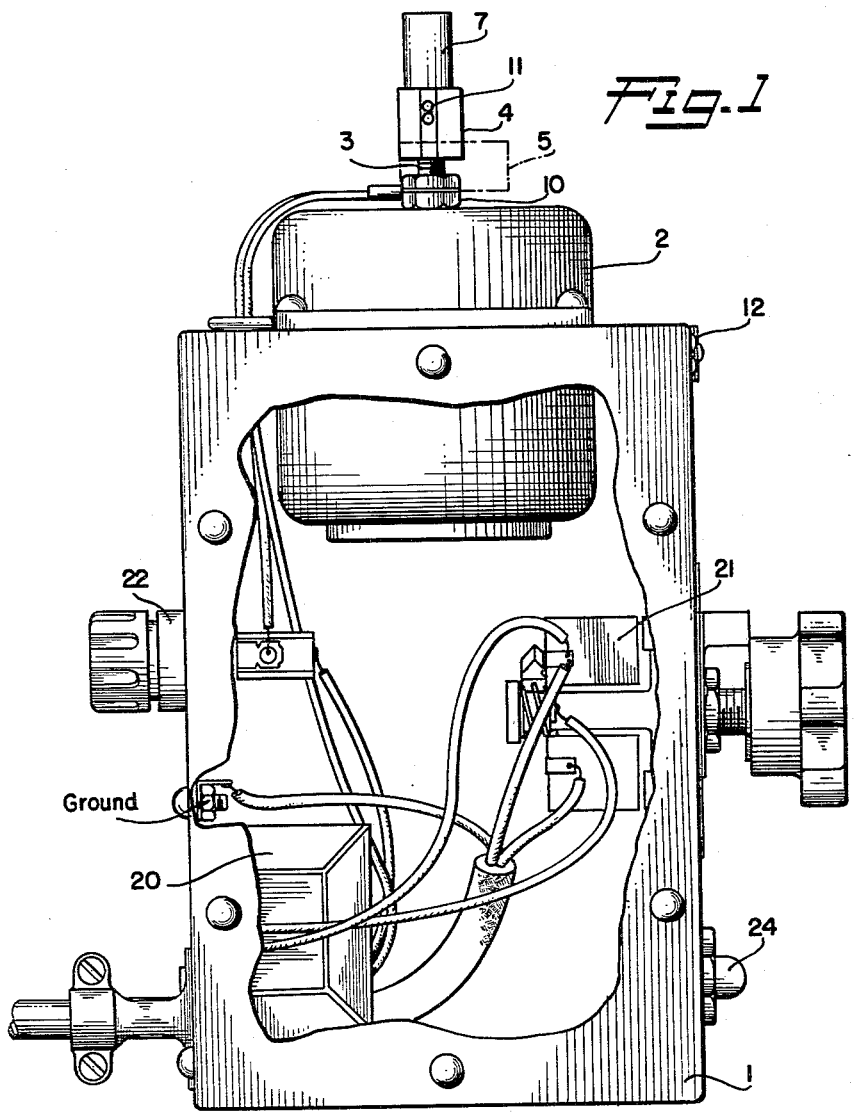

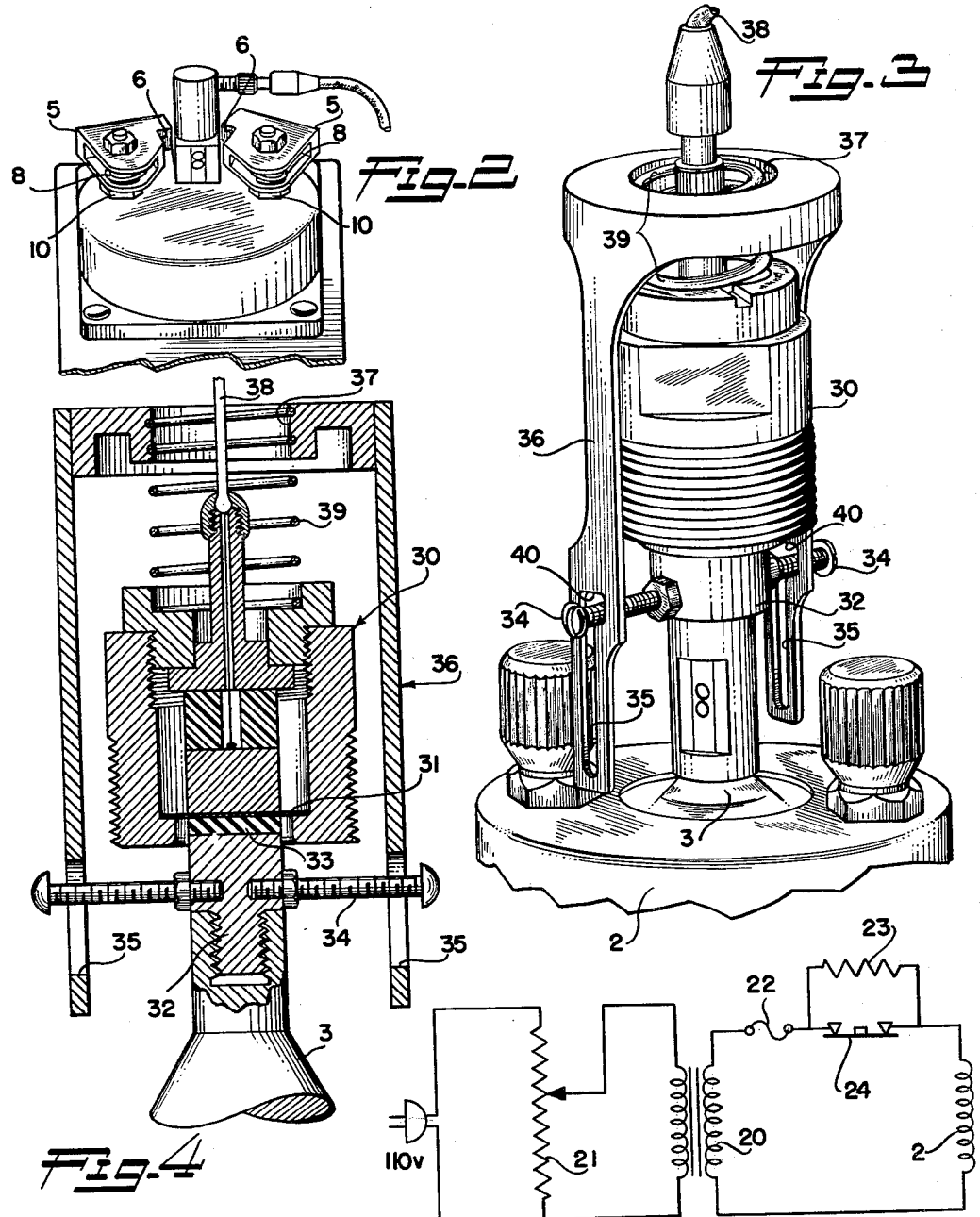

3,165,913
METHOD AND APPARATUS FOR FIELD CALIBRATING PRESSURE AND ACCELERATION MEASURING INSTRUMENTATION SYSTEMS
Thomas A. Perls, Los Altos, Eric Rule, Atherton, Jesse R. Field, Santa Clara, and Frederick J. Suellentrop, Mountain View, Calif., assignors to Lockheed Aircraft Corporation, Burbank, Calif.
Filed Dec. 8, 1959, Ser. No. 858,125
2 Claims. (Cl. 73—1)

This invention relates generally to the field of calibration and specifically directed to a novel, highly portable, hand-held device for directly determining the output of acceleration and pressure measuring transducers and systems at a given level of activation.

Those familiar with the process of preparing a missile, rocket, or space vehicle for launch are acutely aware of the extremely difficult, time-consuming, and exacting procedures necessary to be completed before such a vehicle is ready for flight. Various types of transducers are utilized to transform observed data regarding acceleration, internal pressures, attitude, and the like into electrical signals which can then be telemetered to a data receiving and correlating station. Of primary importance in providing accurate data are the condition responsive devices which initiate the electrical signal, and while various methods have heretofore been developed in the test laboratory for determining the operability of the transmission and receiving systems involved, it has remained a problem to reproduce operating conditions to which the devices and systems are responsive to test and calibrate their responsiveness within predetermined limits.

Among those factors which increase these difficulties are the necessity for testing such devices just prior to actual launching, the fact that such testing must be carried out, because of electrical characteristics, within an extremely short electrical lead distance from the transducer, and because a large number of such observations must be made within a relatively short time. Obviously, because of the particular location of such devices on a vehicle, the use of heavy or cumbersome equipment is out of the question.

The inventors hereof have provided an unusually successful solution to the problem of calibrating pressure and acceleration responsive devices and their associated instrumentation which are close to their operational environment and which enable such systems to be calibrated accurately within the range of operating tolerances specified.

The chief object of the present invention, therefore, is to provide a highly portable, hand-held, lightweight device which may easily be positioned within a close physical range of the device to be tested.

Another object of the invention is to provide a non-complex, reliable, calibrating instrument which does not depend upon associated auxiliary equipment such as oscillators, power amplifiers, pneumatic systems, and the like for its operation.

It is an additional object of this invention to utilize an optical system in combinaton with a vibrator to set the amplitude of operation thereof to a predetermined point. Further, novel mounting means are disclosed for connecting a transducer to the vibration generator.

It is a still further object of the present invention to provide a calibration device, the controls of which are self-contained and which requires only power line or other predetermined electric current of substantially unvarying frequency for its activation.

An additional object of the present invention is to provide a novel, self-contained method of applying a stimulus to a transducer which is independent of meter calibration factors. With these and other objects in view the invention will now be more particularly described in connection with the accompanying drawings wherein like numerals denote like parts throughout, and in which FIGURE 1 is a side-elevation view, shown with a portion broken away, of one modification of the present invention, FIGURE 2 is a three-dimensional representation showing details of the transducer mounting means of FIGURE 1, FIGURE 3 is an isometric representation of a transducer mounting means according to a second modification of the invention, FIGURE 4 is a side-elevational view shown partly in section of the transducer mounting means of FIGURE 3, and FIGURE 5 is a circuit wiring diagram showing the various components of the invention schematically.

As mentioned above, the invention involves the use of a vibrational stimulus upon which are mounted pressure and/or acceleration responsive transducers to be tested while connected to the pressure or acceleration telemetering instrumentation and which duplicate the operational stresses applied to the devices to cause their desired function in a test environment.

Referring to FIGURE 1, the device is depicted in cutaway form showing a chassis 1 having a vibrator unit 2 mounted in the upper surface thereof with a considerable portion of the body of the vibrator within the enclosure formed by the chassis 1. This vibration generator 2 is small and lightweight and has a permanent magnet excitation which eliminates the need for D.C. power in the unit. Vibration generators of this type are commercially available, and are provided with a spindle 3 which accepts the transducer units to be attached to vibrator 2. The inventors have "loaded" spindle 3 with a small, preferably rectangular block of brass or the like 4 to sufficiently bias the movement of the spindle and to place the whole excursion in the uniform region of the magnetic field. In order to eliminate the possibility of damage to the delicate mechanism of the vibration generator 2 during the attaching and disengagement of the transducer to be tested, a pair of spring-biased detents 5 are mounted so as to pivotally swing into engagement with the loading block 4, which conveniently fits into a cutaway or notch portion 6 in each of the detents 5 and securely retains the generator spindle in place as a transducer 7 is threadably attached. In operation, the detents 5 are manually placed in the proper position holding loading block 4 and spindle 3 against unwanted movement and when released, will automatically spring away from the vibrational assembly. Springs 8 are provided as shown to accomplish this action. These detents 5 may conveniently be mounted upon the electrical terminals 10 to which the electrical leads are attached.

Also mounted within chassis 1 is a transformer 20 which is connected to a power rheostat 21 placed across the 110 volt power supply line. The required voltage to operate the vibration generator 2 is only about 2 volts, and this is obtained from a 110 volt supply line by use of a 6.3 volt filament transformer deriving its primary voltage from a 5000 ohm power rheostat 21 connected across the supply line as noted. This configuration is shown schematically in FIGURE 5.

Also included in the circuit is a fuse 22 connected in series with the secondary of the transformer between the transformer and a fixed resistor 23 which can be shorted out by a push switch 24 for a purpose which will be hereinafter described. Obviously, chassis 1 and the components mounted therein could be substantially reduced in size should this be an important factor.

Because of the necessity for speed in carrying out the preflight calibration checkout, a complete frequency response calibration cannot be feasibly conducted, and the present invention was developed to provide a facility which would give a pick-up to read-out calibration point at one frequency and one acceleration level only in a case of the accelerometer transducer modification shown in FIGURE 1. Complete frequency response information is obtained in earlier calibration by recording signals on magnetic tape at a number of frequencies between 20 and 4500 c.p.s., the input signals of which are derived from a network simulating the transducer impedance characteristics and using manufacturers sensitivity data.

In order to permit power to be taken directly from a standard 60 c.p.s. power line, the simple voltage reducing system described was used. The need for oscillators and amplifiers was thus eliminated, and the operating frequency is thereby arbitrarily set at 60 c.p.s., a frequency which has been found to be within the flat response range of the majority of transducers and associated circuitry generally employed in acceleration measurements. The maximum acceleration level obtainable with the vibration generator 2 is of course governed by the maximum stroke of the generator. In the generator utilized by the inventors, a 0.1 inch peak to peak displacement was available while at the 60 c.p.s. line frequency a peak to peak displacement of only 0.077 inch was necessary to produce the calibrating acceleration level of 10g's (root mean square). It has been found that the system described above can be operated with supply voltages as low as 25 volts. For operation at normal line voltage, a stop is provided to limit the travel of the rheostat control 21 limiting the voltage thus applied to the vibrator generator 2 to values which will not cause the rated displacement of the generator to be exceeded. The inventors have found that a device constructed in accordance with the present invention will operate indefinitely without overheating.

A simple and accurate system for setting the amplitude of motion of the vibrating body to a predetermined value was necessary, and a feature of the invention resides in the incorporation of an optical system in the combination of elements set forth above which effectively enables even persons unskilled in this particular field to make accurate adjustments. This optical system consists of geometric figures mounted on loading block 4 in such a way that, in the direction of vibration, they are separated by a distance equal to double the amplitude of the desired motion. A vibration amplitude can then be set to the predetermined level as indicated by the coincidence of the upper excursion limit of one of the geometric figures with the lower excursion limit of the other figure. In this condition, three clear representations of the resulting fiduciary systems are visible, with the central figure much more distinct than the two outer figures because it is in a rest position twice as often as either of the outer figures. The vibration amplitude is then easily set by adjusting the drive voltage for maximum clarity of the center representation. A large number of geometric configurations, varying from two parallel lines to a complicated grid arrangement of converging lines, were tested by the inventors. It was found, however, that the pair-of-circles arrangement as shown at 11 on loading block 4 provided the clearest indication. The dimensions of these circles are critical in determining the accuracy of the system and uniformity of line thickness is equally essential in obtaining a sharply defined central picture. These requirements have been found to be satisfied by making a large scale drawing and reducing the drawing photographically to provide the correct circle dimensions which are then mounted upon the loading block 4.

In operation, it has been found that serious distortion can be introduced into the results obtained with the calibrator hereindescribed if long lengths of transducer connecting cable are supported directly by the transducer and its vibratory system. To eliminate this, cable clips 12 are provided at each corner of chassis 2 and the transducer cable is then secured by one clip desirably six inches or less from the transducer body. The clip most nearly in line with the transducer connector when the unit is properly mounted should be used. Under these conditions, the distortion of the transducer output is entirely negligible as has been shown by comparing the input voltage with the output voltage on a standard oscilloscope. Both patterns showed a sine wave of substantially undistorted form.

Thus, for calibrating an accelerometer type transducer, an arbitrary point is selected on the flat response curve of the transducer and associated circuitry to afford the convenience of connection to standard electrical power sources. Another arbitrary point on the acceleration scale within the limit of transducer response is arbitrarily selected, in this case at 10 $g$'s (root mean square). In order to evaluate the performance of the inventive instrument here involved, a primary standard consisting of a chatter accelerometer was used which provides a simple and accurate method of deriving the accelerometer output at an acceleration of 1$g$ zero to peak. Information on the chatter method is contained in an article by C. W. Kissinger "Determination of Sinusoidal Acceleration at Peak Levels Near that of Gravity by the 'Chatter' Method" issued by the National Bureau of Standards on a variety of piezoelectric accelerometers. In other words, in order to check for accuracy of the degree of excursion of the spindle of the vibration generator 2 of the present invention, an accelerometer of know output at a given $g$-level, and which weighed approximately the same as a transducer to be calibrated, was attached to the vibration generator spindle 3, and the amplitude of oscillation was then determined at the selected $g$-level as set by the circles 11 which were carefully drawn and photographically reduced to a diameter corresponding exactly to the desired amplitude of the oscillation of the vibrator and were then placed on loading block 4 in a prominent position so that they could be easily viewed by an operator. In field testing and preflight checkout, the accelerometer to be tested is then attached to spindle 3 as indicated at 7, and the potentiometer 21 is then adjusted until circles 11 appear in triplicate with a center circle of major definition predominating and, at this point, the oscillation of the vibration generator then corresponds to a $g$-level of approximately 10$g$'s (r.m.s.). The output of the accelerometer is then read by the read-out instruments and the spot calibration is completed.

It has been found that this instrument in cooperation with the optical illusory device 11 is extremely accurate, consistently giving readings within plus or minus 5 percent and, when operated by a person familiar with the system, accuracies well within plus or minus 2½ percent are obtained, which is entirely adequate for its intended use.

Attaching and removing transducers from spindle 3 has already been described with reference to FIGURE 2 which shows the various elements in isometric projection.

Referring to FIGURES 3 and 4, a modification of the transducer mounting means is shown which is adapted to mount a pressure measuring transducer for calibration in a like manner as explained in connection with the acceleration calibrating transducer described hereinabove. The transducer channels which the invention is designed to calibrate were adjusted to give full band width signals for either a ±5 p.s.i. or a ±12.5 p.s.i. stimulus; however, it should be understood that the invention may of course be practiced in connection with the calibration of pressure transducers of varying ranges.

The transducer sensitivity data required to calculate the amplifier gain necessary to establish full band width condition for a given transducer adjustment is obtained by a laboratory calibration of the transducer derived by subjecting it to a step change in pressure. A successful calibration of the system would be obtained if the pressure step were accomplished by burst diaphragm techniques as used, for example, in shock tube work, but such a technique is quite unsuitable for field use. An ideal way in which to calibrate a pressure measuring channel would be to subject the transducer to dynamic air pressure variations of, for example, ±5 p.s.i. or ±12.5 p.s.i. at a frequency within the flat response region of the transducer-vibration coupler combination. The system according to the present invention will operate at 60 c.p.s. which is within the flat response range of normally used pressure transducers and their associated circuitry. The problems involved in producing sinusoidal changes in air pressure at 60 c.p.s. with an amplitude of ±5 p.s.i. or ±12.5 p.s.i. are at present insurmountable in a field device and, in fact, are very formidable in a laboratory. Pressure amplitudes of only about ±1 p.s.i. can be produced in portable pistonphone devices. The problem of applying suitable large dynamic pressures to the diaphragm of a pressure transducer has been solved in a novel way by the inventors by utilizing the sensitivity of the transducer to vibration when the diaphragm itself is artifically loaded. If the loading mass is M lbs., uniformly distributed over the surface of the diaphragm, and the area of the diaphragm is A inches², the loading mass per unit area will be $$\frac{M}{A} \text{ lb./in.}^2$$

and if the transducer is now vibrated sinusoidally so as to have a peak acceleration of $\pm a(g\text{'s})$, the peak force per unit area, $P$ lb./in.² on the diaphragm is given by $$P = \frac{M}{A} \text{ lb./in.}^2$$

In order to avoid the difficulties of mounting a loading mass to the diaphragm of the transducer, the mass of the transducer itself is, where possible, used as the seismic mass which generates the necessary force when the transducer diaphragm is accelerated. In order to drive the large mass of the transducer to the required acceleration, while keeping power requirements and consequent heating to a minimum, the inventors have constructed the suspension system of vibration generator 2 so that, when loaded with a pressure sensitive transducer, the entire system would be resonant at 60 c.p.s., the chosen frequency of oscillation. It has been found that this construction results in a much more robust suspension system which is not liable to accidental damage and therefore does not require any special protective measures.

This pressure transducer mounting arrangement is shown in detail in the modification set forth in FIGURES 3 and 4. In these figures, the pressure sensitive transducer 30 is mounted so that its diaphragm 31 rests on a pedestal 32 fitted to the drive spindle 3 of vibration generator 2. As shown in FIGURE 4, pedestal 32 is provided with a rubber pad 33 which is in direct contact with diaphragm 31. Pedestal 32 is also provided with outrigger bolts 34 which cooperate with slots 35 in mounting frame 36 to secure the transducer 30 in place in a manner which will be hereinafter more fully explained.

Frame 36 is shown to be substantially circular at one end and to have downwardly extending arms which contain slots 35. Frame 36 has an aperture 37 in the upper end thereof to allow for connection of the transducer connecting cable 38. Also secured within the end of frame 36 is a retaining coil spring 39. In mounting a transducer into the mounting apparatus just described, outrigger bolts 34 are disengaged from the eyelets 40 in slots 35, thus enabling the frame 36 to be vertically withdrawn for insertion thereinto of the transducer to be mounted. The transducer assembly is inserted into this "cavity" and is attached to a cable 38 previously inserted through aperture 37 and the center of retaining spring 39. After attachment the transducer is manually biased upwardly so that its diaphragm 31 may be positioned upon the rubber pad 33 on pedestal 32. Frame member 36 is then downwardly moved so that outrigger bolts 34 once again are positioned within eyelets 40 in slots 35 thus retaining transducer 30 in a secured position in the frame with its diaphragm 31 in firm contact with pedestal 32 and vibration generator drive spindle 3.

The fact that the generator suspension system has been stiffened so that the combination of vibration generator and transducer operate in a resonant condition serves to reduce distortion in the sinusoidal motion of the transducer. As viewed on an oscilloscope screen, distortion in the output voltage waveform from the transducer under test has proven to be negligible. Measured harmonic content of the waveform is less than 2 percent.

In one of the transducers utilized in tests, the transducer mass was 0.176 lb. and the diameter of the diaphragm was .532 in. so that the area (A) of the diaphragm is .222 in.². Applying the equation noted above, we find that the peak acceleration required to provide a peak pressure (force per unit area) of ±12.5 lb./in.² is $$a = \frac{\pm PA}{M} = \frac{\pm 12.5}{.176} \times .222 = \pm 15.65g$$

The double amplitude of motion at 60 c.p.s. necessary to provide this ±15.65g acceleration corresponding to ±12.5 p.s.i. excitation is then .083 in., which the vibration generator utilized was easily able to provide.

The same optical method as utilized in connection with the structure of FIGURES 1 and 2 is utilized in calibrating pressure transducers mounted in accordance with the teachings of FIGURES 3 and 4. Thus, the amplitude of the vibration generator is controlled by the potentiometer 21, and the setting is optically determined as described above by the formation of three distinct circles, at which point the device would be oscillating at a given amplitude. The force on the diaphragm of the transducer at this point can easily be determined, and the electrical output noted to complete the calibration.

In order to obtain a calibration or reading at a point corresponding to a reduced pressure on the transducer diaphragm, switch 24 was provided on the chassis and inserted into the circuit diagram as shown in FIGURE 5. This switch 24 is a push switch, which is mounted in shunt across resistor 23. When switch 24 is pushed, the full resistance value of resistor 23 is inserted into the circuit which results in a reduced current being supplied to the vibration generator, reducing the amplitude thereof to a point which can be predetermined by a selection of resistance values. Thus, once the optical system is utilized to set the vibration generator at a given amplitude, an additional reading can be obtained merely by pushing switch 24 which reduces the oscillations of the vibration generator and gives a reading, in this case, corresponding to ±5 p.s.i. Obviously, a series of such resistances could be placed in the circuit to give a plurality of calibrated points.

The vibration generator of the present invention may be substantially identical as far as the transducer components are concerned. Obviously, however, varying requirements will necessitate certain engineering changes to effect desired results. It has been found that this arrangement most satisfactorily enables on-the-spot, rapid, preflight calibration of pressure and acceleration responsive transducers and instrumentation systems such as are often incorporated in missiles and the like.

While certain preferred embodiments of the invention have been specifically disclosed and described, it is to be understood that the invention is not limited thereto, as many variations will be readily apparent to those skilled in the art, and the invention is to be given the broadest interpretation within the terms of the following claims.

We claim:

1. A device for calibrating force measuring instrumentation systems comprising a vibration generator, a potentiometer connected between a power line source and said vibration generator for varying the vibration amplitude thereof, said vibration generator having an oscillatory spindle upon which is threadably mounted a substantially rectangular loading block, said loading block having a pair of contiguous circles on at least one vertical surface thereof longitudinally aligned with the axis of vibration of said spindle, the radius of each of said circles being substantially equal to the zero-to-peak excursion of said spindle, a portion of said spindle extending through said loading block and adapted to threadably receive a transducer assembly thereon, and at least one detent pivotally connected to the upper surface of said vibration generator, said detent having a notch adapted to receive at least a corner portion of said loading block to maintain the same against twisting movement as a transducer is attached or disengaged from said spindle, said detent being normally spring biased out of contact with said loading block.

2. The method of calibrating a force measuring instrumentation system comprising the steps of mounting a transducer on the drive spindle of a vibration generator, providing a pair of circles in contiguous vertical alignment with the axis of vibration of said drive spindles, the radius of each of which is equal to a predetermined zero-to-peak excursion of said drive spindle, vibrating said drive spindle at a variable rate until said pair of circles appears as three circles, and noting the output of said transducer.

References Cited by the Examiner
UNITED STATES PATENTS 2,270,294  1/42  Hall _____ 73—70.2 X
2,625,152  1/53  Frohring _____ 73—71.5 X

OTHER REFERENCES

Article from "Instruments & Automation," by A. B. Kaufman et al., pages 1510 and 1511, September 1955.

ISAAC LISANN, *Primary Examiner.*
ROBERT B. HULL, *Examiner.*